United States Patent [19]

Saka

[11] Patent Number: 4,630,850
[45] Date of Patent: Dec. 23, 1986

[54] PIPE JOINT

[75] Inventor: Yoshimi Saka, Suzuka, Japan

[73] Assignee: Hitachi Metals, LTD, Tokyo, Japan

[21] Appl. No.: 655,736

[22] Filed: Sep. 28, 1984

[30] Foreign Application Priority Data

Sep. 30, 1983 [JP] Japan ................. 58-180637

[51] Int. Cl.[4] .................................. F16L 21/06
[52] U.S. Cl. .................... 285/322; 285/39;
  285/55; 285/334.4; 285/354; 285/903; 285/910
[58] Field of Search ............ 285/354, DIG. 4, 322,
  285/323, 34, 55, 334.4, 903, 910

[56] References Cited

U.S. PATENT DOCUMENTS

| 2,323,912 | 7/1943 | Johnson | 285/334.5 |
| 3,008,738 | 11/1961 | Longfellow | 285/354 X |
| 3,233,924 | 2/1966 | Stanley et al. | 285/322 |
| 3,291,895 | 12/1966 | Van Dyke | 285/322 X |
| 4,437,691 | 3/1984 | Lancy | 285/DIG. 4 |

FOREIGN PATENT DOCUMENTS

| 51-44174 | 10/1976 | Japan . |
| 55-50460 | 11/1980 | Japan . |
| 57-46182 | 3/1982 | Japan . |
| 58-109790 | 6/1983 | Japan . |
| 58-94988 | 6/1983 | Japan . |

Primary Examiner—Dave W. Arola
Attorney, Agent, or Firm—Finnegan, Henderson, Farabow, Garrett & Dunner

[57] ABSTRACT

A pipe joint suitable for connection with a flexible tubular member includes a joint body, a sleeve and a cap nut. The cap nut is threadably fitted over one end portion of the joint body defining a tapering axial bore communicating with a cylindrical axial bore and having a shoulder at its axial inner end. The sleeve split axially into a plurality of segments at a cutout has a flange at its axial outer end, and at least one ridge of a currugation extending from its inner surface into engagement with one of grooves of a corrugated outer surface of the flexible tubular member. To assemble, the sleeve is fitted over the outer surface of the flexible tubular member in such a manner that one to five ridges of the corrugated outer surface of the flexible tubular member extend axially inwardly of an axial inner end of the sleeve, and the flexible tubular member is inserted in the tapering axial bore while the sleeve is held between the cap nut threadably fitted over the joint body and the flexible tubular member. As the cap nut is tightened, the sleeve moves axially inwardly into the tapering axial bore and is forced against the joint body while reducing the diameter of the flexible tubular member, until the one to five ridges of the flexible tubular member are compressed between an axial inner end of the sleeve and the shoulder and the inner surface of the sleeve is forced against the outer surface of the flexible tubular member to provided a seal therebetween. The flange of the sleeve is brought into abutting engagement with an axial inner end of the tapering axial bore, to thereby restrict the extent to which the cap nut is tightened.

13 Claims, 8 Drawing Figures

PIPE JOINT

BACKGROUND OF THE INVENTION (1) Field of the Invention

This invention relates to a pipe joint for a connection of a flexible tube having a corrugation at its outer peripheral surface and another flexible tube or an ordinary tube for water flow or gas flow.

(2) Description of the Prior Art

In connecting this type of tubular member to a pipe joint, it has hitherto been usual practice to work on the corrugation at one end portion of the tubular member to change it to a cylindrical configuration without corrugation and secure the cylindrical end portion to the pipe joint as by brazing or to flare one end portion of the tubular member in the form of a letter V as the bell of a trumpet and bring the V into pressing engagement with the pipe joint. These two processes require working on the tubular members in a factory, so that the present practice is to cut an elongated flexible tube into desired lengths and a pipe joint is secured to either end of each length of flexible tubular member. However, this arrangement is not satisfactory because the requirements for the flexible tubular member may vary from one site to another in the field depending on the conditions under which pipe laying operations are performed. In some sites, pipe laying may not be performed satisfactorily utilizing only the flexible tubular members arranged in a factory as mentioned.

To obviate this disadvantage, proposals have been made to cut an elongated tubular member at the site of operation and attach a rubber packing on the outer peripheral surface of a length of tubular member obtained by cutting in order to fit a pipe joint to it. However, there remain such disadvantages as that rubber packings may deteriorate and shorten the service life of the pipe joint and the pipe joint may be low in heat resisting capabilities, because of the rubber packing.

SUMMARY OF THE INVENTION

OBJECT OF THE INVENTION

This invention has been developed for the purpose of obviating the aforesaid disadvantages of the prior art. Accordingly, the invention has as its object the provision of a pipe joint for a flexible tubular member, capable of preventing leaks and heat-resisting over a prolonged period of time, which enables a suitable length of flexible tubular member severed from an elongated flexible tube at the site of pipe laying in a manner to serve the purpose and suit the condition of the site to be readily used without any trouble to effect joining of the flexible tubular member to another member, by solving the problem of leaks of the fluid due to deterioration and thermal expansion of rubber packings.

STATEMENT OF THE INVENTION

The pipe joint according to the invention enabling the aforesaid object to be accomplished generally includes a joint body having an outer threaded portion on the outer peripheral surface at one side thereof and having a tapering axial bore becoming smaller in diameter in going toward an inner middle portion of the joint body and a shoulder at the inner middle portion where the tapering bore is brought into communication with another bore located at the opposite side of the joint body for a gas or liquid flow a sleeve having an inner surface formed at least in a position corresponding to the shape of the outer surface of a flexible tube to be connected, an outer surface to be pressed at least partially to the tapering inner surface of the joint body, and at least one cutout axially formed of the sleeve, and a cap nut engaging the outer threaded portion of the joint body to press the end portion of the flexible tube toward the shoulder of the joint body.

Additional and other objects, features and advantages of the invention will become apparent from the description set forth hereinafter when considered in conjunction with the accompanying drawings.

DESCRIPTION OF THE PREFERRED EMBODIMENTS

Preferred embodiments of the invention will now be described by referring to the accompanying drawings.

Figure 1:
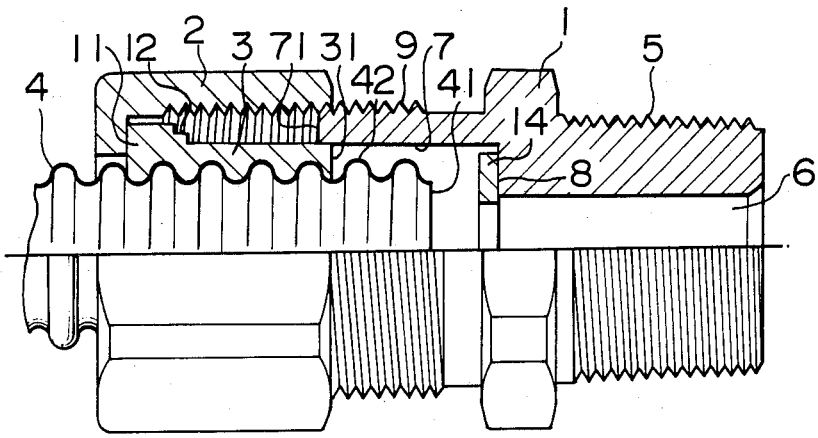
FIG. 1 is a front view, with certain parts being shown in section, of the pipe joint comprising one embodiment of the invention, as connected to a flexible tubular member with the cap nut in a loose position.
Figure 2:
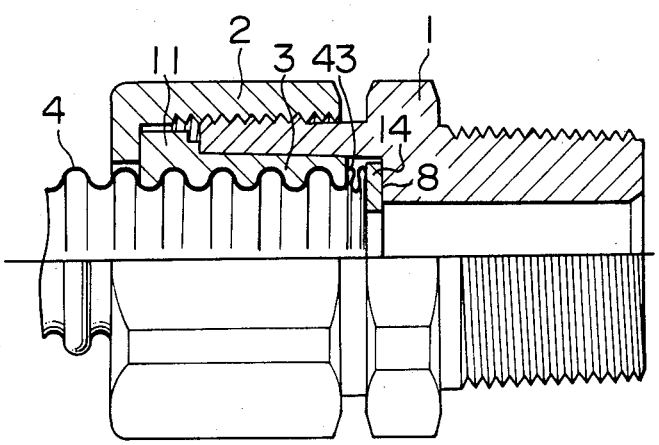
FIG. 2 is a front view, with certain parts being shown in section, of the pipe joint shown in FIG. 1, as connected to the flexible tubular member with the cap member in a tightened position.

FIGS. 1 and 2 show one embodiment of the invention, showing the cap nut of the pipe joint in a loose position in FIG. 1 and showing the cap nut of the pipe joint in a tightened position in FIG. 2. The pipe joint comprises a joint body 1 which is provided with an outer peripheral surface of one side thereof with an outer threaded portion 9 and an inner peripheral surface thereof with a tapering axial bore 7 having its diameter successively reduced in going toward the inner middle portion of the joint body 1. The joint body 1 is formed at an outer peripheral surface in the opposite side thereof with an outer threaded portion 5 for threadably connecting the pipe joint to a desired member or apparatus and at an inner peripheral surface thereof with a cylindrical axial bore 6 maintained in communication with the tapering bore 7 which is formed with a shoulder 8. A tubular member 4 is made of thin sheet steel in a corrugation form at its outer peripheral surface, and a sleeve 3 formed at an inner peripheral surface thereof with a corrugation complementary with the corrugation at the outer peripheral surface of the flexible tubular member 4 is fitted to the outer peripheral surface of the flexible tubular member 4. The sleeve 3 forms a compressed ridge portion 43 at an end portion of the flexible tubular member 4 between an end 31 of the sleeve 3 and the shoulder 8 when a cap nut 2 fitted partially over the one side portion of joint body 1 is tightened to force the flexible tubular member 4 against the shoulder of the joint body 1. There is formed a flange 11 at an axial outer end of the sleeve 3 which abuts on the axial outer end 71 of the sleeve 3 to regulate the extent to which the cap nut 2 is tightened to force the flexible tubular member 4 against the shoulder 8. The cap nut 2 which is generally of cylindrical configuration is formed at an inner peripheral surface with an inner threaded portion engaging the outer threaded portion 9 at the outer peripheral surface of the joint body 1 and at an end portion with a flange positioned against the axial outer end of the sleeve 3. The outer peripheral surface of the sleeve 3 disposed inwardly of the flange 11 is also tapering but the angle of taper is smaller by 0 to 10 degrees than the angle of taper of the tapering bore 7. In the embodiment shown and described hereinabove, the tapering bore 7 has an angle of taper of about 2 degrees, and the outer peripheral surface of the sleeve 3 is cylindrical and has no tapering. The numeral 12 designates an offset portion on the sleeve 3 which can be caught as by a driver to facilitate separation of the sleeve 3 from the joint body 1 when the flexible tubular member 4 is removed from the pipe joint by loosening the cap nut 2 after the tubular member 4 is connected to the joint body 1 by tightening the cap nut 2. Thus, the off-set portion 12 has nothing to do with the sealing performance of the pipe joint.

Figure 3:
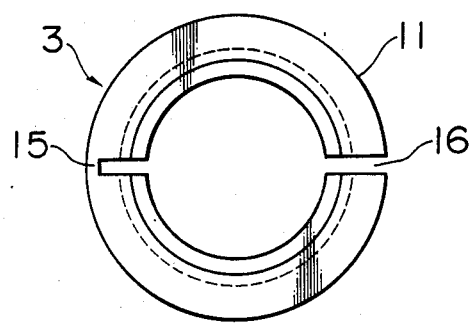
FIG. 3 is a side view of the sleeve shown in FIGS. 1 and 2, showing the cutout formed axially of the sleeve.

As shown in FIG. 3, the sleeve 3 is formed with a cutout 16 which split the sleeve into axially separated segments except at 15 on the flange 11. A heat resisting gasket 14 is mounted to the shoulder 8. It is necessary to mount the gasket 14 when the corrugation of the flexible tubular member 4 comprises a spirally arranged convolutions, to increase the sealing performance of the pipe joint by bringing an axial inner end 41 of the flexible tubular member 4 into intimate contact with the shoulder 8. However, when the corrugation of the flexible tubular member 4 comprises a plurality of independent ridges and grooves 42 connected together as a unitary structure, it is not essential to provide the gasket 14 because the axial inner end 41 and shoulder 8 are maintained in intimate contact with each other at the entire outer periphery of the axial inner end 41.

The pipe joint of this construction is connected to the tube 4 as follows. The cap nut 2 is fitted over the flexible tubular member 4, and the sleeve 3 is opened at the cutout 16 and fitted over the flexible tubular member 4 in such a manner that one to five ridges 42 of the corrugation of the flexible tubular member 4 extend forwardly of the axial inner end 31 of the sleeve 3. If the material of the sleeve 3 is soft metal, such as copper or a copper alloy, the portion 15 of the flange 11 remains intact even if the cutout 16 is opened by hand. Then, the sleeve 3 fitted over the flexible tubular member 4 as described hereinabove is covered by the cap nut 2 and inserted in the tapering bore 7 of the joint body 1 as shown in FIG. 1, and thereafter the cap nut 2 is threadably connected to the outer threaded portion 9 of the joint body 1. By tightening the cap nut 2 which is in threadable engagement with the joint body 1, the sleeve 3 moves axially inwardly of the tapering bore 7 while having its diameter reduced to press against the flexible tubular member 4. As the sleeve 3 moves axially inwardly, the independent ridges and grooves 42 at the axial inner end portion of the tube 4 also move in the same direction until the axial inner end 41 abuts against the shoulder 8 when the ridges and grooves 42 stop movement and are compressed as the cap nut 2 is tightened until the compressed ridge portion 43 is formed as shown in FIG. 2 between the axial inner end 31 of the sleeve 3 and the shoulder 8 of the joint body 1. A seal is provided between the compressed ridge portion 43 and the shoulder 8. As described hereinabove, the heat resistant gasket 14 is interposed between the compressed ridge portion 43 and the shoulder 8 in the embodiment shown in FIGS. 1 and 2, to thereby increase the sealing performance of the pipe joint. However, the provision of the gasket 14 is not essential, and a satisfactory seal can be provided between the axial inner end 41 of the tube 4 and the shoulder 8 of the joint body 1 by metal-to-metal contact.

In the embodiment of the invention shown in FIGS. 1 and 2 and described hereinabove, a flexible tube can be cut to a desired length and connected to a desired apparatus with ease. Since the sleeve 3 is formed of metal, the pipe joint can have a prolonged service life by eliminating the need to use a rubber packing, because the disadvantage of the prior art that leaks of the fluid might occur due to deterioration in the quality of the rubber packing when the pipe joint has long been in service.

In the embodiment of the invention, the flexible tubular member 4 is strongly forced by the sleeve 3 against the joint body 1. By virtue of this structural feature, any vibration, bending moment, twisting moment or strain that might act on the flexible tubular member 4 is kept from being transmitted to the axial inner end 41 of the tubular member 4 which is maintained in intimate contact with the shoulder 8 of the joint member 1, so that no stresses are applied to the interface between the axial inner end 41 of the tubular member 4 and the shoulder 8 of the joint body 1. Thus, the seal provided between the axial inner end 41 and shoulder 8 is impervious to stresses applied from outside.

The arrangement whereby the cylindrical outer peripheral surface of the sleeve 3 fitted in the tapering bore 7 is made smaller in tapering angle than the wall of the tapering bore 7 allows the axial inner end portion of the sleeve 3 to be locally compressed and forced strongly against the flexible tubular member 4 in initial stages of tightening of the cap nut 2. This is conducive to prevention of twisting of the flexible tubular member 4 because the occurrence of the phenomenon of rotation of the flexible tubular member 4 together with the cap nut 2 can be avoided when the cap nut 2 is tightened.

The provision of the flange 11 at the axial outer end of the sleeve 3 enables the extent to which the cap nut 2 is tightened to be regulated, to thereby set the distance covered by the movement of the sleeve 3 and the amount of a reduction in the diameter of the sleeve 3 at optimum levels.

The arrangement whereby the cutout 16 is formed in the sleeve 3 to divide the sleeve 3 into axial segments while leaving the axial sections connected together at the portion 15 of the flange 11 as shown in FIG. 3 facilitates mounting of the sleeve 3 to the outer peripheral surface of the flexible tubular member 4 because the sleeve 3 can be expanded and wound on the flexible tubular member 4 and then the sleeve 3 can be closed when the operation of mounting it on the flexible tubular member 4 is finished. Additionally, since the axial segments of the sleeve 3 are connected together and not separated from each other, no discrepancy occurs between the axial segments and uniform pressure can be applied by the sleeve 3 to the flexible tubular member 4 at all times, and handling of the sleeve 3 is facilitated.

The provision of the offset portion 12 on an axial inner end of the flange 11 which abuts against the axial outer end 71 of the tapering bore 7 of the joint body 1 when the cap nut 2 is tightened enables the sleeve 3 to be readily removed from the joint body 1 by inserting a driver or other tool in the gap between the flange 11 and the axial outer end 71, when the need arises to disconnect the flexible tubular member 4. Thus, the parts of the pipe joint according to the invention can be readily disassembled and assembled again.

Figure 4:
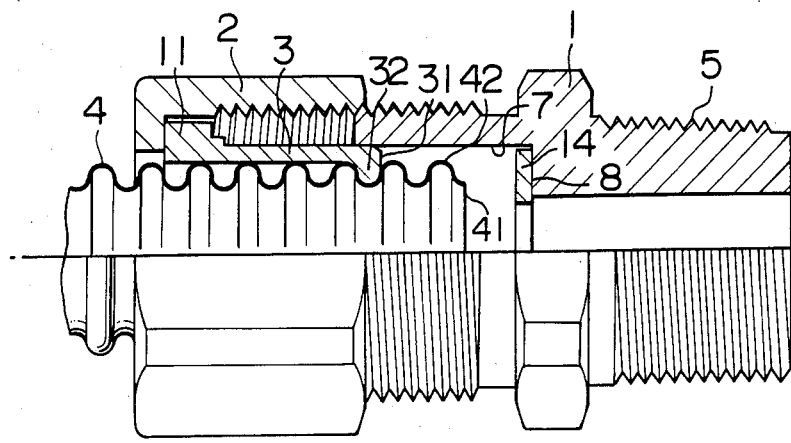
FIG. 4 is a view similar to FIG. 1 but showing the sleeve comprising another embodiment.
Figure 5:
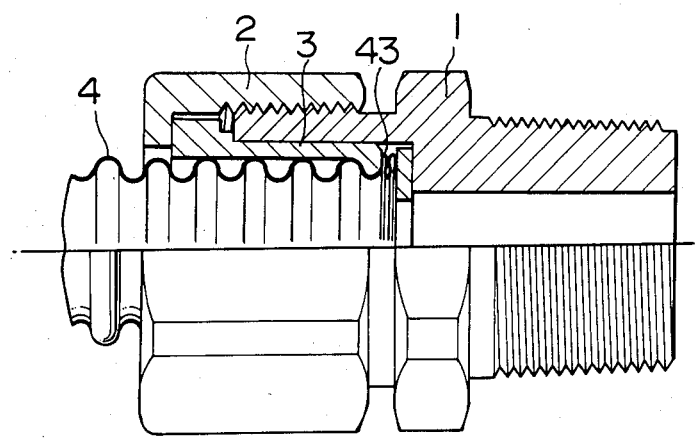
FIG. 5 is a view similar to FIG. 2 but showing the sleeve shown in FIG .4.
Figure 6:
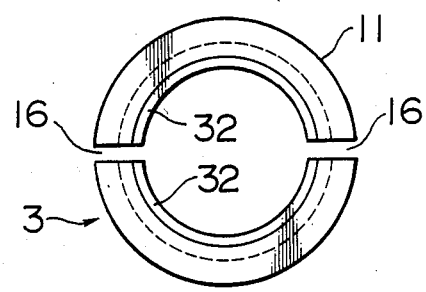
FIG. 6 is a view similar to FIG. 3 but showing the cutout formed axially of the sleeve of the pipe joint shown in FIGS. 4 and 5.

FIGS. 4-6 show another embodiment of the pipe joint in conformity with the invention in which the joint body 1 and cap nut 2 are similar to those of the embodiment shown in FIGS. 1-3 but the sleeve 3 is distinct from the corresponding part of the embodiment shown in FIGS. 1-3 in the shape of its inner peripheral surface. More specifically, the sleeve 3 is formed at an axial inner end of its inner peripheral surface with a downwardly extending annular projection 32 which engages one of the grooves of the corrugation formed at the outer peripheral surface of the flexible tubular member 4 to move the flexible tubular member 4 axially inwardly of the tapering bore 7, and the rest of the inner peripheral surface of the sleeve 3 is a cylindrical surface of a diameter substantially equal to the outer diameter of the flexible tubular member 4. The sleeve 3 is split into two axial segments at the cutout 16, so that the sleeve can be readily fitted to the outer peripheral surface of the flexible tubular member 4.

In connecting the pipe joint of the aforesaid construction to the flexible tubular member 4, the cap nut 2 is fitted over the flexible tubular member 4 as is the case with the embodiment shown in FIGS. 1-3, and the sleeve 3 is fitted over the flexible tubular member 4 in such a manner that one to five ridges of the corrugation of the flexible tubular member 4 extend forwardly of the axial inner end 31 of the sleeve 3. The sleeve 3 fitted over the flexible tubular member 4 is inserted in the tapering bore 7, and the cap nut 2 is threadably connected to the joint body 1, as shown in FIG. 4. Thereafter, the cap nut 2 is tightened to force the axial inner end portion 42 of the flexible tubular member 4 against the shoulder 8 of the joint body 1 to form the compressed ridge portion 43 between the axial inner end 31 of the sleeve 3 and the shoulder 8 of the joint body 1 as shown in FIG. 5, by moving the sleeve 3 axially inwardly in the tapering bore 7. Thus, a seal is provided to the pipe joint and the flexible tubular member 4 by the axial inner end 41 of the flexible tubular member in abutting engagement with the shoulder 8 of the joint body 1. In the embodiment shown in FIGS. 4-6, the only one annular projection 32 is formed at the axial inner end of the inner peripheral surface of the sleeve 3 for engagement with one of the grooves of the corrugation formed at the outer peripheral surface of the flexible tubular member 4, and the rest of the inner peripheral surface of the sleeve 3 is a cylindrical surface. This allows the sleeve 3 to be readily fitted over the outer peripheral surface of the flexible tubular member 4 even if there are some errors in the configuration of the tubular member 4 and the pitch of the ridges and grooves of the corrugation at the cutter peripheral surface of the tubular member 4. Also, the production cost of the sleeve 3 of the embodiment shown in FIGS. 4-6 is reduced because of a reduction in the area of the corrugation as compared with the sleeve 3 of the embodiment shown in FIGS. 1-3.

Figure 7:
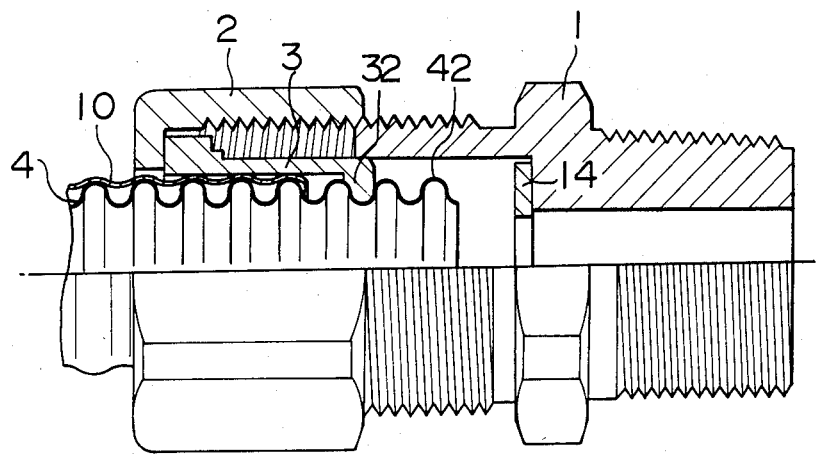
FIGS. 7 and 8 are views similar to FIGS. 4 and 5, respectively, but showing the flexible tubular member provided with a cover member joined to the embodiment of the sleeve shown in FIGS. 4 and 5.
Figure 8:
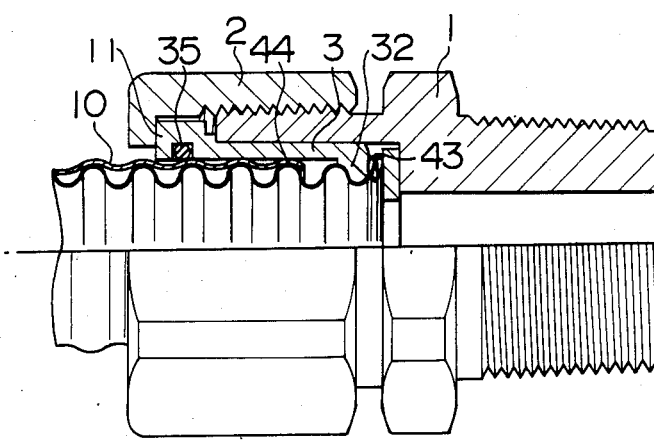

FIGS. 7 and 8 show the pipe joint shown in FIGS. 4-6 being connected to the flexible tubular member 4 provided with a protective cover 10. As shown, the downwardly extending annular projection 32 formed at the axial inner end of the inner peripheral surface of the sleeve 3 is brought into engagement with one of the grooves of the corrugation at the outer peripheral surface of the flexible tubular member 4 at which the protective cover 10 has been cut off and the protective cover 10 is brought into engagement with the cylindrical surface of the sleeve 3. As the cap nut 2 is tightened when the sleeve 3 and flexible tubular member 4 are structurally arranged as aforesaid, the sleeve 3 moves axially inwardly of the tapering bore 7 and has its diameter reduced while forcing the protective cover 10 against the outer periphery of the flexible tubular member 4, until the compressed ridge portion 43 is formed between the axial inner end of the sleeve 3 and the shoulder of the joint body 1 and the protective cover 10 is compressed between the cylindrical inner peripheral surface of the sleeve 3 and the ridges of the corrugation at the outer peripheral surface of the flexible tubular member 4 as indicated at 44, to provide a seal against entry of a fluid from outside into the pipe joint.

As shown in FIG. 8, an O-ring groove may be formed at an inner surface of the flange 11 of the sleeve 3 and an O-ring 35 may be fitted therein. This provides an additional seal to the pipe joint against entry of a fluid.

From the foregoing description, it will be appreciated that the invention enables a desired length of flexible tubular member cut from an elongated flexible tube to be readily connected to the pipe joint at the side of pipe laying. In the pipe joint provided by the invention, the end of the flexible tubular member connected to the joint body of the pipe joint is liquiditightly sealed and enclosed by the joint body. This structural feature is conducive to prolonged service life of the pipe joint because the risk of the fluid leaking through the joint due to stresses applied from outside or corrosion of the parts of the pipe joint can be eliminated over a prolonged period of time.

What is claimed is:

1. Apparatus for sealingly coupling to a free end of a flexible corrugated tubing, the tubing free end having an axially directed face, the apparatus comprising:

a body having an axial, generally straight through-bore portion terminating at an inner annular shoulder with an axial sealing face, and a threaded outer surface;

a sleeve having an inner corrugated surface complementing the outer surface of the tubing to be coupled and having an axially straight outer surface radially opposed to said inner corrugated surface and disposed in sliding engagement with said axial bore portion, said sleeve also having at least one axial slit extending through the sleeve wall; and a cap nut overlying said sleeve and having a threaded inner surface engaging said body outer threaded surface, said cap further including a flange engaging said sleeve member for urging said sleeve into said axial bore portion toward said shoulder upon rotation of said cap, said axial bore portion being tapered relative to said sleeve outer surface to converge in the direction toward said shoulder, whereby during coupling operation rotation of said cap nut, acting through said sleeve member, will force the tubing end face into axial sealing engagement with said shoulder and simultaneously force said slit sleeve into radial pressing engagement with the outer surface of the corrugated tubing.

2. The apparatus as in claim 1 wherein said axial bore portion is tapered and said sleeve outer surface is level.

3. The apparatus as in claim 1 or 2 wherein said axial bore is tapered about 2°.

4. The apparatus as in claim 1 wherein both said axial bore portion and said sleeve outer surface are tapered toward said shoulder and wherein the angle of taper of said sleeve is smaller than the angle of taper of said axial bore portion by an amount greater than 0° and less than 10°.

5. The apparatus as in claim 1 for sealingly coupling to the free end of a spiral-type corrugated tubing further including a circular gasket mounted on said shoulder axial sealing face.

6. The apparatus as in claim 5 wherein said gasket is made of a heat-resisting material.

7. The apparatus as in claim 1 wherein said sleeve is a one-piece sleeve and includes integral hinge means for permitting separation of said slit edges to increase the sleeve inner diameter, whereby said sleeve can be engaged with a corrugated flexible tubing of the type having alternating axially spaced annular ridges and troughs.

8. The apparatus as in claim 7 wherein said sleeve has at least one other axially extending slit spaced from said through-slit, said other slit extending only partially through the sleeve wall, the unslit wall portion comprising said integral hinge means.

9. The apparatus as in claim 1 wherein said sleeve inner surface complementarily engages from 1 to 5 of the ridges of the corrugated tubing.

10. The apparatus as in claim 1 wherein said sleeve has an integral, cylindrical, non-engaging guide portion positioned distant said shoulder.

11. A pipe joint comprising:

a length of flexible corrugated tubing having a free end;

a coupling body having an axial generally straight through-bore portion terminating at an inner annular shoulder with an axial sealing face, and a threaded outer surface;

a sleeve having an inner corrugated surface complementing and contacting the outer surface of said tubing, said sleeve having an axially straight outer surface radially opposed to said inner corrugated surface and disposed in sliding engagement with said axial bore portion, said sleeve also having at least one axial slit extending through the sleeve wall; and a cap nut overlying said sleeve and having an inner surface engaging said body outer threaded surface, said cap further including a flange engaging said sleeve member and urging said sleeve into said axial bore portion toward said shoulder, said axial bore portion being tapered relative to said sleeve outer surface to converge in the direction toward said shoulder, the face of said free tubular end being in axial sealing engagement with said shoulder and said slit sleeve being in radial pressing engagement with the outer surface of said corrugated tubing.

12. The pipe joint as in claim 11 wherein both said axial bore portion and said sleeve outer surface are tapered toward said shoulder and wherein the angle of taper of said sleeve outer surface is smaller than the angle of taper of said axial bore portion by an amount greater than 0° and less than 10°.

13. The pipe joint as in claim 11 wherein said sleeve is a one-piece sleeve and includes integral hinge means for permitting separation of said slit edges to increase the sleeve inner diameter, whereby said sleeve can be engaged with a corrugated flexible tubing of the type having alternating axially spaced annular ridges and troughs.

* * * * *